Feb. 19, 1963 H. C. LIEB 3,078,327
SOLID STATE CELL
Filed Sept. 18, 1959
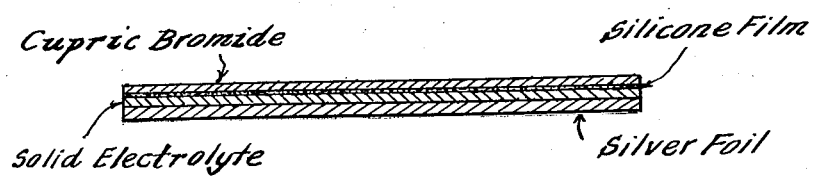
INVENTOR
*Harry C. Lieb,*
BY Watson, Cole, Grindle & Watson
ATTORNEYS

United States Patent Office 3,078,327
Patented Feb. 19, 1963

3,078,327
SOLID STATE CELL
Harry C. Lieb, Rockville Centre, N.Y., assignor to Leesona Corporation, Cranston, R.I., a corporation of Massachusetts
Filed Sept. 18, 1959, Ser. No. 840,817
5 Claims. (Cl. 136—83)

This invention relates to primary electrochemical cells which consist entirely of solid components and to solid state batteries which comprise an assembly of such cells.

Present day electronic circuitry frequently requires a source of relatively high voltage but low current capacity and, in many applications, it is desirable to supply these requirements with a miniature battery, provided that reliable operation can be obtained over an extended period of time. One example of such a battery is disclosed in the co-pending application of Harry C. Lieb et al., Serial No. 730,059, filed April 22, 1958, now Patent No. 2,930,-830, for Solid-State Cell and Battery. This battery utilizes cells consisting essentially of a silver anode, a halogen-containing cathode and a solid electrolyte comprising a halide selected from the group consisting of chlorides, bromides and iodides and certain amounts of tellurium. According to one method of making up such cells, the solid electrolyte is mechanically applied to the anode material. It has been observed that under some conditions in this type of cell a certain corrosive action may take place at the interface between the halogen-containing cathode and the solid electrolyte which causes a delamination of the electrolyte and subsequent short circuiting of the cell.

Accordingly, it is an object of this invention to render the solid electrolyte film of halide plus tellurium resistant to delamination from the silver anode and to the corrosive action of a bromine or other halogen-containing electrode.

It is another object of this invention to render the electrolyte film resistant to the corrosive action of a bromine or halogen-containing electrode without impairing the normal ion movement.

Briefly, I have discovered that protective films of silicones are efficient in preventing the corrosion and delamination described above without deleteriously effecting the normal operation of the battery.

These and various other objects and features of the invention will be more clearly understood from a reading of the detailed description in conjunction with the drawing which shows a view in section of one illustrative embodiment of this invention.

In one illustrative embodiment of this invention an aqueous emulsion containing 35% silicone solids is sprayed or otherwise applied to the electrolyte surface and then placed in an oven and cured at a temperature of the order of 250° C. for a period of the order of one hour. The concentration of the emulsion is not critical. A high concentration is preferable, however, because it facilitates drying. Advantageously, this treatment does not adversely affect the current carrying capacity of the battery system.

An exemplary battery construction may be as follows: A layer of silver foil, a layer of the solid electrolyte upon the face of the silver foil (this solid electrolyte may be of the silver bromide plus tellurium type), a film of silicone upon the solid electrolyte surface and a deposit of cupric bromide electrode upon the silicone film, as shown in the drawing.

While I have discovered that protective films of silicones in general are efficient, I have discovered that an emulsion of dimethyl polysiloxane having a viscosity of 350 to 500 centistokes is particularly effective in preventing the corrosion and delamination. One exemplary undiluted water emulsion contains about 35% of silicone fluid and has an average particle size of less than 0.5 micron, which is about 1/10 the particle size of most silicone emulsions. The emulsion has proved to be most effective when used undiluted, although a dilution down to 1% may be employed successfully. It is important that the resulting film be microporous. A microporous layer permits the passage of the bromine vapor, which is necessary for proper chemical action while preventing the passage of moisture through the film. If moisture passes through the film, hydrobromic acid will be formed, which acid corrodes the electrolyte as explained above. In order to form a mircoporous film, an emulsion should be employed in which the particle size is less than one micron.

While I have described the principles of this invention with regard to one illustrative cell manufactured by the method, it will be understood by persons skilled in the art that the principles thereof may be applied to various embodiments of the invention.

What is claimed is:
1. An electrochemical cell having a silver anode, a halogen-containing cathode, a solid electrolyte comprising a halide selected from the group consisting of chlorides, bromides and iodides and a microporous silicone film between said cathode and said electrolyte.
2. An electrochemical cell as claimed in claim 1 in which said film is of the kind deposited from an aqueous emulsion of silicone having a particle size of less than 1 micron.
3. An electrochemical cell as claimed in claim 2 in which said film is of the kind deposited from an aqueous emulsion of dimethyl polysiloxane having a particle size of less than 1 micron.
4. An electrochemical cell having a silver anode, a cupric bromide cathode, a solid electrolyte consisting essentially of silver bromide and tellurium and a microporous silicone film between said cathode and said electrolyte.
5. An electrochemical cell having a silver anode, a cupric bromide cathode, a solid electrolyte consisting essentially of silver bromide and about 3%–10%, by weight, of tellurium and a microporous silicone film deposited on said electrolyte between said electrolyte and said cathode.

References Cited in the file of this patent
UNITED STATES PATENTS

| | | |
|---|---|---|
| 2,778,754 | Shorr | Jan. 22, 1957 |
| 2,793,244 | Van Der Grinten | May 21, 1957 |
| 2,816,151 | Ruben | Dec. 10, 1957 |
| 2,847,493 | Smyth et al. | Aug. 12, 1958 |
| 2,923,757 | Klopp | Feb. 2, 1960 |
| 2,930,830 | Lieb et al. | Mar. 29, 1960 |

OTHER REFERENCES

Dow Corning Silicone Notebook (Reference No. 2003, issued June 1952), published by Dow Corning Corporation, pages 4, 10, 11 and 20 are relied on.